Aug. 23, 1932.    R. M. RIBLET    1,872,814
SPRING SHACKLE
Filed Feb. 13, 1931
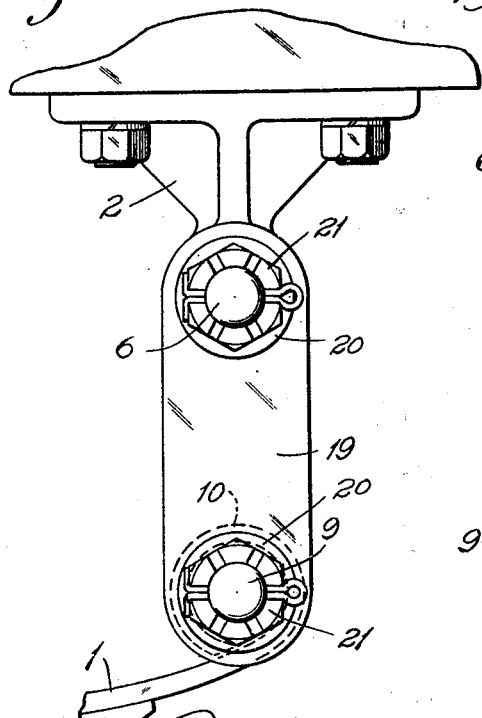
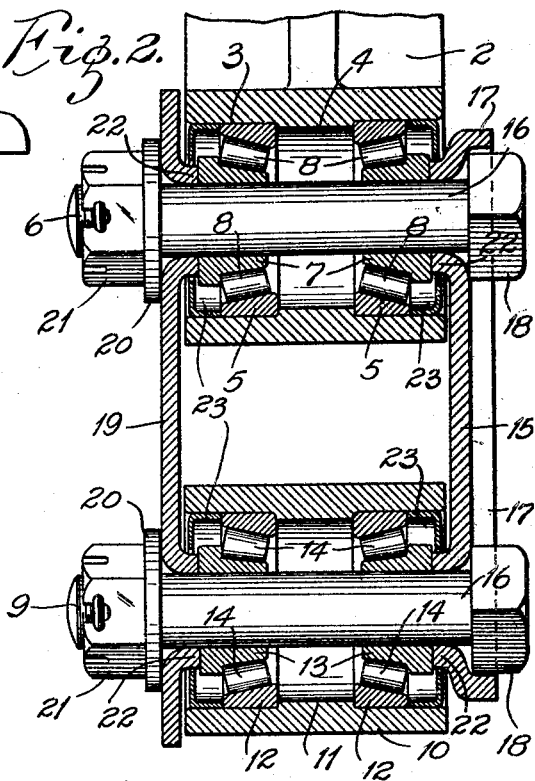
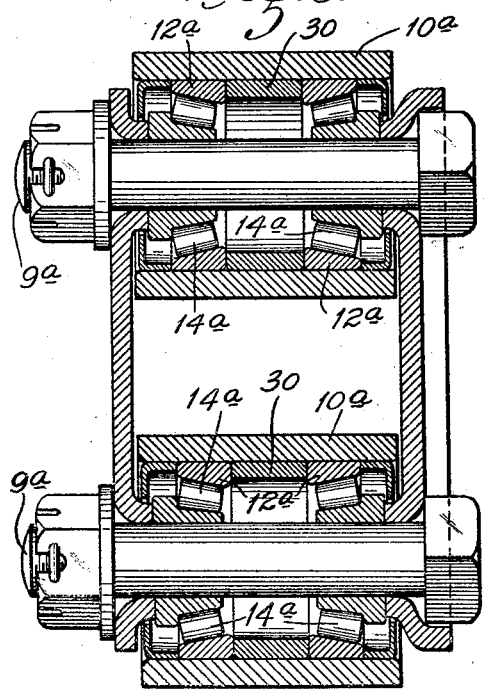
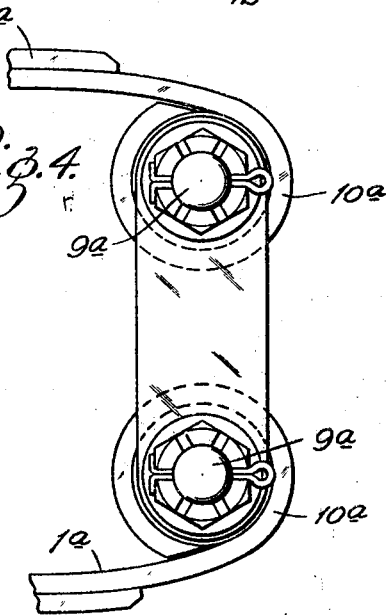
INVENTOR:
Robert M. Riblet
by Cau Mau & Gravely
HIS ATTORNEYS.

Patented Aug. 23, 1932

1,872,814

UNITED STATES PATENT OFFICE

ROBERT M. RIBLET, OF CANTON, OHIO, ASSIGNOR TO THE TIMKEN ROLLER BEARING COMPANY, OF CANTON, OHIO, A CORPORATION OF OHIO

SPRING SHACKLE

Application filed February 13, 1931. Serial No. 515,496.

My invention relates to roller bearing spring shackle constructions for motor vehicles and the like. It has for its principal object a construction that is simple and economical to manufacture, in which the parts are easily available for inspection and repair and that provides for proper positioning and adjustment of the shackle bearings. The invention consists in the spring shackle and in the parts and combinations and arrangements of parts hereinafter described and claimed.

In the accompanying drawing,

Fig. 1 is a side elevation of a spring shackle embodying my invention.

Fig. 2 is a vertical sectional view thereof on an enlarged scale.

Fig. 3 is a sectional view similar to Fig. 2 showing a slight modification; and

Fig. 4 is an elevation of the modified construction shown in Fig. 3.

Figs. 1 and 2 illustrate a shackle connecting one end of a spring 1 with a member 2 of the frame of a motor vehicle or the like. The frame member 2 has a bore 3 therethrough having a central annular rib 4 against which abut bearing cups 5. Extending through the bore of the frame member 2 is a shackle bolt 6 on which are mounted bearing cones 7, rollers 8 being interposed between each cone and cup.

A second shackle bolt 9 extends through an eye 10 or bore formed in the end of the spring member 1, such eye being provided with an internal annular rib 11 against which abut bearing cups 12, the bearing cones 13 being mounted on said shackle bolt 9 and rollers 14 being interposed between said cups and cones.

At one side of the shackle member is a shackle plate 15 having holes to receive the shanks 16 of said bolts 6 and 9, respectively, and having a flanged edge 17 to receive the heads 18 of said bolts. At the other side of the shackle member is a second shackle plate 19 provided with holes through which extend the ends of said bolts 6 and 9, washers 20 being placed on said bolts and a nut 21 on the end of each bolt engaging one of said washers and pressing it against the shackle plate 19. Each shackle plate 15 and 19 has annular ribs 22 engaging the cone of one bearing. Suitable closure members 23 are provided for the ends of the bores of frame member and the spring member.

By tightening the nuts on the bolts 6 and 9, the bearings are firmly held in position, each cone being engaged by one of the shackle plates.

The slightly modified form shown in Figs. 3 and 4 is illustrated as being interposed between two spring members 1a, each shackle bolt 9a extending through an eye 10a formed at the end of each of the spring members 1a. Conical roller bearings 14a are interposed between each shackle bolt 9a and the spring member 1a in which it is mounted. Instead of an integral rib in said spring members, a spacer ring 30 which has a heavy press fit and is mounted between the bearing cups 12a. As in the construction of Figs. 1 and 2, the bearings are firmly held in the springs and adjustment is easily provided for.

What I claim is:

1. A spring shackle construction comprising a pair of shackle bolts extending through eye members, roller bearings mounted on said shackle bolts and in said eye members and shackle plates connecting said shackle bolts, said plates having annular ribs engaging members of said bearings.

2. A spring shackle construction comprising a pair of shackle bolts extending through eye members of springs, roller bearings mounted on said shackle bolts and in said eye members and shackle plates mounted on said shackle bolts to connect them together, said plates having portions engaging the inner bearing members of said bearings.

3. A spring shackle construction comprising a pair of springs having eye members, shackle bolts extending through said eye members, roller bearings mounted on said shackle bolts and in said eye members and shackle plates connecting said shackle bolts, said plates having portions engaging members of said bearings.

4. A shackle construction comprising a pair of eye members having internal annular rib portions, shackle bolts extending through said eye members, bearing cups in said eye members abutting against said ribs, bearing cones on said bolts, bearing rollers between said cups and cones, and shackle plates connecting said shackle bolts, said plates having annular ribs engaging the ends of said bearing cones.

Signed at Canton, Ohio, this 10th day of Feb., 1931.

ROBERT M. RIBLET.